United States Patent
Komatsu (10) Patent No.: US 7,643,173 B2
(45) Date of Patent: Jan. 5, 2010

(54) IMAGE PROCESSING APPARATUS, IMAGE PROCESSING METHOD, AND PRINTER DRIVER

(75) Inventor: Manabu Komatsu, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 690 days.

(21) Appl. No.: 11/206,130

(22) Filed: Aug. 18, 2005

(65) Prior Publication Data

US 2006/0056683 A1    Mar. 16, 2006

(30) Foreign Application Priority Data

Sep. 1, 2004   (JP) ............................. 2004-253819

(51) Int. Cl.
*G06F 15/00* (2006.01)
(52) U.S. Cl. .................... 358/1.9; 358/518; 358/530; 358/448; 358/520; 399/39
(58) Field of Classification Search ................ 358/518, 358/530, 448, 520, 1.9; 399/39
See application file for complete search history.

(56) References Cited

U.S. PATENT DOCUMENTS

| | | | |
|---|---|---|---|
| 5,519,515 A | 5/1996 | Komatsu | |
| 5,576,845 A | 11/1996 | Komatsu | |
| 5,610,732 A | 3/1997 | Komatsu | |
| 5,678,135 A | 10/1997 | Fukui et al. | |
| 5,751,433 A * | 5/1998 | Narendranath et al. | 358/1.9 |
| 5,831,751 A | 11/1998 | Ohneda et al. | |
| 6,005,970 A | 12/1999 | Ohneda et al. | |
| 6,016,359 A | 1/2000 | Komatsu | |
| 6,324,356 B1 * | 11/2001 | Inoue | 399/39 |
| 6,796,629 B2 | 9/2004 | Komatsu et al. | |
| 2001/0019427 A1 | 9/2001 | Komatsu | |
| 2001/0055129 A1 * | 12/2001 | Shimizu | 358/520 |
| 2005/0008258 A1 | 1/2005 | Suzuki et al. | |

FOREIGN PATENT DOCUMENTS

| | | |
|---|---|---|
| JP | 7-107280 | 4/1995 |
| JP | 11-112789 | 4/1999 |
| JP | 2001-83845 | 3/2001 |
| JP | 2001-130055 | 5/2001 |
| JP | 2003-66781 | 3/2003 |

OTHER PUBLICATIONS

U.S. Appl. No. 08/359,146, filed Dec. 19, 1994, Manabu Komatsu.
U.S. Appl. No. 09/567,477, filed May 8, 2000, Manabu Komatsu, et al.

* cited by examiner

*Primary Examiner*—Twyler L Haskins
*Assistant Examiner*—Michael Burleson
(74) *Attorney, Agent, or Firm*—Oblon, Spivak, McClelland, Maier & Neustadt, L.L.P.

(57) ABSTRACT

An image processing apparatus is provided that processes image data to be output by an imaging apparatus. The image processing apparatus includes a target setting part for setting a target pertaining to imaging material saving that involves controlling the amount of imaging material used which target is set based on a designated condition, and a color reproducing condition adjusting part for adjusting a color reproducing condition for input color information based on the set target.

13 Claims, 8 Drawing Sheets

| RECORDING CONTROL SIGNAL | C INK QUANTITY (pl) | M INK QUANTITY (pl) | Y INK QUANTITY (pl) | K INK QUANTITY (pl) |
|---|---|---|---|---|
| 0 | 0 | 0 | 0 | 0 |
| 1 | 5 | 5 | 6 | 4 |
| 2 | 10 | 10 | 12 | 8 |
| 3 | 15 | 15 | 18 | 12 |
| . . | . . | . . | . . | . . |
| 127 | 1000 | 1000 | 1100 | 900 |
| 128 | 1020 | 1020 | 1120 | 920 |
| 129 | 1040 | 1040 | 1140 | 940 |
| . . | . . | . . | . . | . . |
| 253 | 6920 | 6920 | 6920 | 6920 |
| 254 | 6960 | 6960 | 6960 | 6960 |
| 255 | 7000 | 7000 | 7000 | 7000 |

FIG.8

IMAGE PROCESSING APPARATUS, IMAGE PROCESSING METHOD, AND PRINTER DRIVER

BACKGROUND OF THE INVENTION

1. Field of the Invention

The present invention relates to an image processing apparatus, an image processing method, and a printer driver for processing image data to be output at an imaging apparatus.

2. Description of the Related Art

Generally, an image processing apparatus such as a personal computer or a workstation that processes image data is arranged to be capable of inputting image data including color graphics and/or color images and processing the image data using application software so as to form a document including characters, graphics, and images.

An imaging apparatus such as a printer, a facsimile machine, a copier, or a printer/facsimile/copier multifunction imaging apparatus that outputs the document as an output image is arranged to form the output image using imaging material such as toner or recording liquid (ink) according to an image formation method such as the inkjet recording method or the electrophotographic method.

When color graphics and color images make up a large portion of the document image to be output, the amount of imaging material such as color toner or color ink to be used increases to thereby result in an increase in running cost.

In response to such a problem, a color printer has been developed in the prior art that implements a so-called ink saving mode or toner saving mode (imaging material saving mode) that reduces the amount of imaging material used in forming an image. In such a color printer apparatus, when the imaging material saving mode is selected, a predetermined process is performed so that the total amount of ink used for an output image may be reduced.

For example, Japanese Laid-Open Patent Publication No. 7-107280 discloses a toner saving mode that is realized by detecting edge information included in image data and printing a portion of an image that is determined to correspond to an inner region with a reduced amount of ink.

Japanese Laid-Open Patent Publication No. 11-112789 discloses a technique of skipping every other pixel data from bitmap image data representing a pattern and forming an image based on the image data resulting from the pixel skipping so as to reduce the number of pixels to be reproduced and thereby reduce the amount of ink or toner to be used in the image formation process.

Japanese Laid-Open Patent Publication No. 2001-130055 discloses a technique in which plural different modes including an ink saving mode and a high image quality mode are set, and when the ink saving mode is set and an operator requests for high quality image, the operating mode is automatically switched from the ink saving mode to the high quality image mode.

Japanese Laid-Open Patent Publication No. 2001-83845 discloses a technique of switching a toner saving method (e.g., dither pattern, reduction of the concentration value of a monochrome background object) according to the depiction object.

Japanese Laid-Open Patent Publication No. 2003-66781 discloses a technique involving processing image data using a toner saving profile set for each depiction object.

According to the prior art techniques described above, color reproducing modes are switched in order to reduce the total amount of imaging material used in the image formation process. As a result, the overall color concentration of the reproduced image may be decreased compared to that of a normal output image so that the overall image quality may be degraded.

In other words, the prior art techniques described above are not adaptable to a situation in which accurate reproduction of a color image portion of a color document is desired while allowing some alterations in the color reproduction of character and graphic portions of the color document upon generating print output of a color document including characters, graphics, and images. Therefore, the imaging material saving mode according to the prior art is not always capable of reflecting the desires and preferences of the user pertaining to color reproduction.

SUMMARY OF THE INVENTION

The present invention has been conceived in response to one or more of the problems of the related art, and its object is to provide an image processing apparatus, an image processing method, and a printer driver for enabling color reproduction reflecting the desires and preferences of a user under an imaging material saving mode.

According to one aspect of the present invention, an image processing apparatus is provided that processes image data to be output by an imaging apparatus, the image processing apparatus including:

a target setting part for setting a target pertaining to imaging material saving that involves controlling the amount of imaging material used which target is set based on a designated condition; and a color reproducing condition adjusting part for adjusting a color reproducing condition for input color information based on the set target.

In a preferred embodiment of the present invention, the color reproducing condition adjusting part is configured to estimate the amount of imaging material corresponding to the color reproducing condition, compare the estimated amount of imaging material with the set target, and adjust the color reproducing condition according to the comparison result.

In another preferred embodiment of the present invention, the color reproducing condition adjusting part is configured to adjust the color reproducing condition with respect to each type of object included in a document to be imaged. In this case, the target setting part is preferably configured to set the target pertaining to imaging material saving with respect to each type of object included in the document to be imaged.

In another preferred embodiment of the present invention, the color reproducing condition adjusting part is configured to adjust a γ value of an input color space.

In another preferred embodiment of the present invention, the color reproducing condition adjusting part is configured to adjust a gamut compression condition for input color information. In this case, the color reproducing condition adjusting part is preferably configured to adjust a compression direction of the gamut of a perceptual color space, or the color reproducing condition adjusting part is preferably configured to adjust a compression rate of the gamut of a perceptual color space.

In another preferred embodiment of the present embodiment, the color reproducing condition adjusting part includes an allowable color difference setting part for setting an allowable color difference for predetermined color information; an estimating part for estimating a reproduction color and a color difference corresponding to the color reproducing condition for the color information; and a color reproducing condition setting part for setting the color reproducing condition in accordance with the allowable color difference.

In another preferred embodiment of the present invention, the color reproducing condition adjusting part includes an allowable color difference setting part for setting an allowable color difference for predetermined color information; an estimating part for estimating a reproduction color and a color difference corresponding to the color reproducing condition for the color information; and a message output part for outputting a message concerning whether to perform imaging material saving which message is output when the estimated color difference for the color reproducing condition exceeds the allowable color difference.

According to another aspect of the present invention, an image processing method is provided for processing image data to be output by an imaging apparatus, the method including:

processing the image data according to a color reproducing condition defined by adjusting a γ value of an input color space according to a target pertaining to imaging material saving that involves controlling the amount of imaging material used which target is set according to a designated condition.

According to another aspect of the present invention, an image processing method is provided for processing image data to be output by an imaging apparatus, the method including:

processing the image data according to a color reproducing condition defined by adjusting a gamut compression condition for input color information according to a target pertaining to imaging material saving that involves controlling the amount of imaging material used which target is set according to a designated condition.

According to another aspect of the present invention, a print driver is provided that is run on a computer for processing image data to be output by an imaging apparatus, the print driver being executed by the computer to perform:

a target setting step for setting a target pertaining to imaging material saving that involves controlling the amount of imaging material used which target is set according to a designated condition; and a color reproducing condition adjusting step for adjusting a color reproducing condition for input color information according to the set target.

DESCRIPTION OF THE PREFERRED EMBODIMENTS

In the following, preferred embodiments of the present invention are described with reference to the accompanying drawings.

Figure 1:
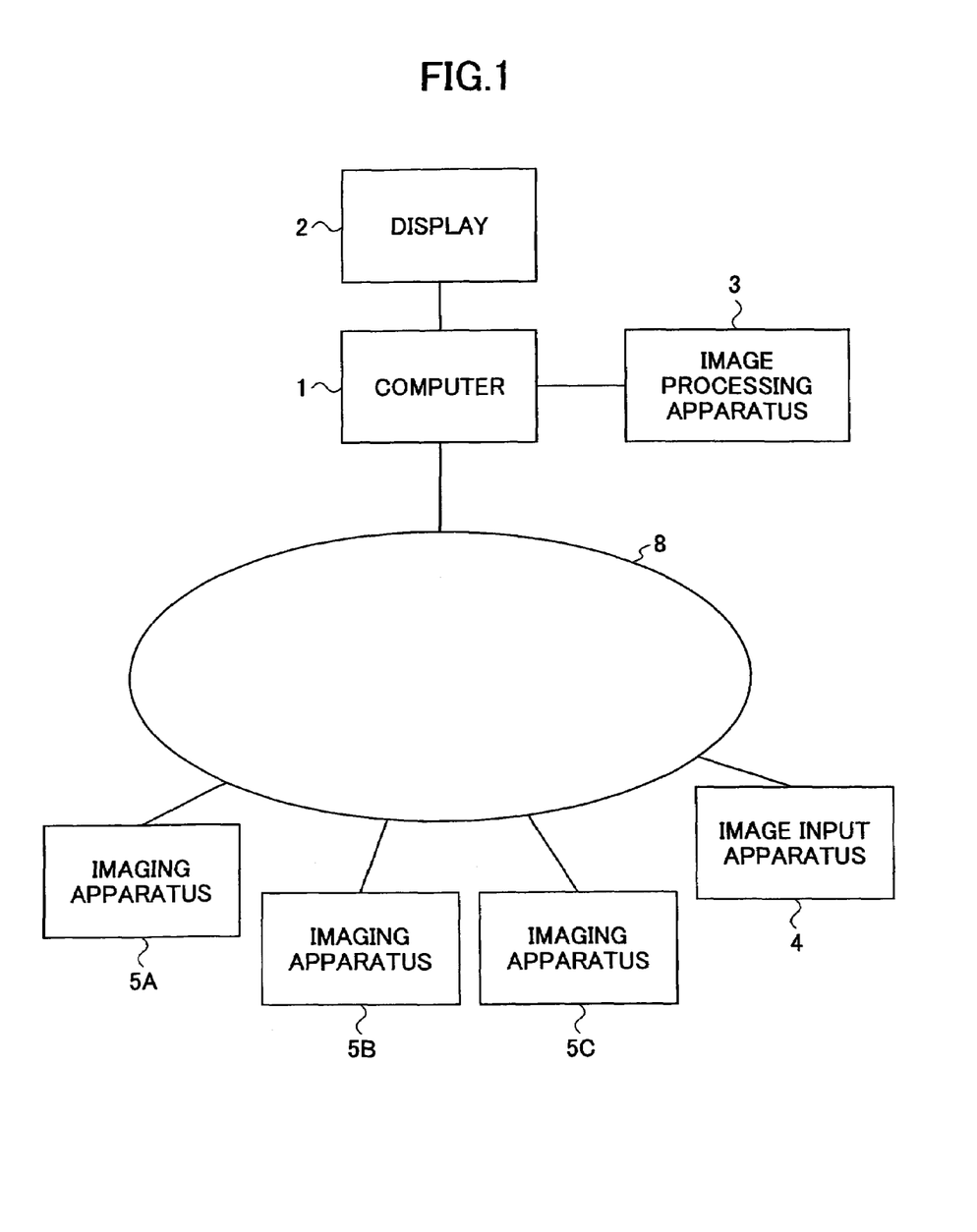
FIG. 1 is a block diagram showing a configuration of an image processing system according to an embodiment of the present invention.

FIG. 1 is a block diagram illustrating a configuration of an image processing system including an image processing apparatus according to an embodiment of the present invention.

The illustrated image processing system includes a computer 1, an image display apparatus (display) 2, an image processing apparatus 3, an image input apparatus 4, and plural imaging apparatuses 5A through 5C.

In the illustrated example, the display 2 and the image processing apparatus 3 are directly connected to the computer 1, and the image input apparatus 4 and the imaging apparatuses 5A through 5C are connected to the computer 1 via a local area network (LAN) 8. However, it is noted that the image input apparatus 4 and the imaging apparatuses 5A through 5C (collectively referred to as imaging apparatus 5) do not necessarily have to be connected to the computer 1 via the LAN 8 and may also be directly connected to the computer 1.

The computer 1 includes various types of software such as applications used to perform various data processes and drivers such as a printer driver. The display 2 corresponds to a display apparatus for displaying various output results. The image processing apparatus 3 has a processing function for converting a color signal supplied from the computer 1 that is unique to this device (e.g., RGB signal, CMY signal, or CMYK signal) into a color signal that is unique to a selected one of the imaging apparatuses 5A, 5B, or 5C, for example.

The image input apparatus 4 is an input apparatus for inputting image data, and may correspond to a color scanner or a digital camera, for example.

The imaging apparatus 5 is an apparatus that is configured to form a color image based on image data (e.g., gray-scaled image data or gray scale data in the present example), and may correspond to a printer, a facsimile apparatus, a copier, a plotter, or a printer/facsimile/copier multifunction imaging apparatus that is capable of color output, for example. It is noted that the imaging apparatus 5 may correspond to any type of imaging apparatus that uses an imaging material to form an image. For example, the imaging apparatus may be configured to form an image based on the inkjet recording method or the electrophotographic method.

It is noted that the number of input/output apparatuses (e.g., image display apparatus, image input apparatus, imaging apparatus) connected to the computer 1 is not limited to the illustrated example.

In the following, the processing functions of the computer 1 and the image processing apparatus 3 of the image processing system are described with reference to FIG. 2.

Figure 2:
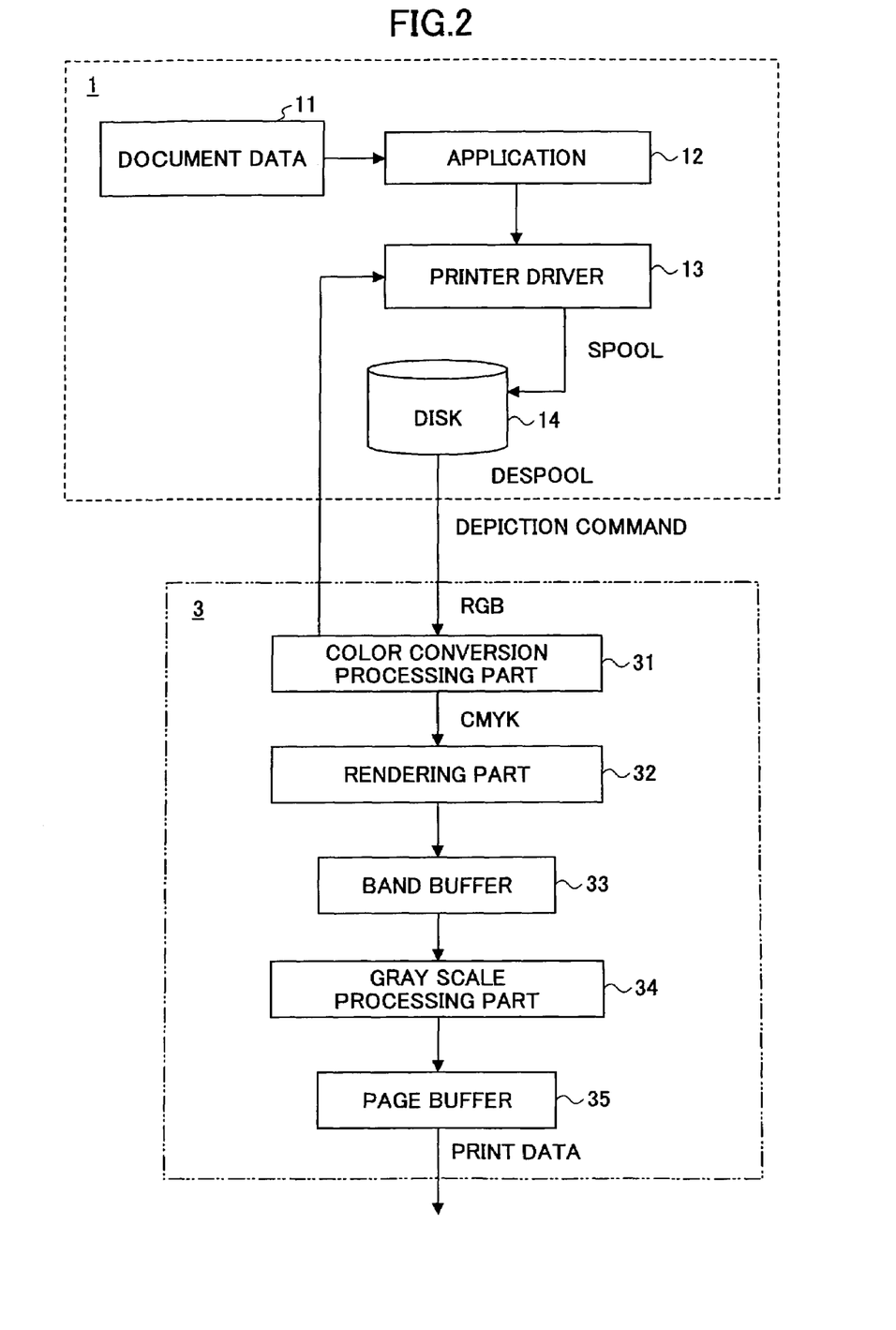
FIG. 2 is a block diagram showing configurations of a computer and an image processing apparatus of the system according to the present embodiment.

As is shown in FIG. 2, the computer 1 includes application software 12 for generating text data (document) 11, a printer driver 13 for performing required processes for printing the text data 11 at the imaging apparatus 5 such as converting the text data 11 supplied from the application software 12 into a depiction command in a format that may be processed by the image processing apparatus 3, and a disk (storage means) 14 for storing a depiction command supplied from the printer driver 13.

The image processing apparatus 3 includes a color conversion processing part 31 that performs color conversion processes on color data in RGB format included in the depiction command exchanged between the computer 1 and the image processing apparatus 3, a rendering part 32 that converts image data in command format into image data in raster format, a band buffer 33 for storing the image data in raster format, a gray scale processing part 34 that performs gray scale processes such as a dithering process on the image data in raster format stored in the band buffer 33 to convert the image data into gray scale data in a format that may be processed by the imaging apparatus 5, and a page buffer 35 that stores the gray scale data obtained at the gray scale processing part 34. The image processing apparatus 3 has the function of converting a depiction command transmitted from the computer 1 into data in a format that may processed by the imaging apparatus 5.

In the following, operations of the image processing system according to the present embodiment are described. According to one example, the image processing system realizes operations involving displaying image data within the computer 1 on the display 2, transmitting the image data to the image processing apparatus 3 for processing in order to enable the color imaging apparatus 5 to form and output (print) an image corresponding to the image data, receiving the processing result from the imaging apparatus 3 and transmitting the processing result to the imaging apparatus 5.

In this case, the image data corresponds to a color signal representing color components R (red), G (green), and B (blue) that are used for realizing conventional color display.

The computer 1 transmits the RGB signal to the image processing apparatus 3. At the image processing apparatus 3, the RGB signal is converted into a CMYK signal representing color components C (cyan), M (magenta), Y (yellow), and K (black) that corresponds to a recording control signal that is capable of controlling the color imaging apparatus 5. The computer 1 then receives the resulting CMYK signal, and transmits the CMYK signal to the imaging apparatus 5. In turn, the imaging apparatus 5 forms and outputs (prints) a corresponding color image based on the received CMYK signal.

In the following, detailed descriptions are given of the operation processes of generating a depiction command to be transmitted to the image processing apparatus 3 at the computer 1, processing image data at the image processing apparatus 3, and outputting the processing result to the imaging apparatus 5.

The computer 1 may be operated by a user (operator), and editing processes may be performed while displaying image data on the display 2 using application software 12, for example. When the editing processes are completed, an imaging apparatus 5 to which the processing result is to be output may be designated, and printing may be selected using the application software 12.

In this case, the printer driver 13 displays on the display 2 printing properties so that the user may set varisou printing conditions while viewing the printing properties. In this case, the user may select an imaging material saving mode for printing an image with a reduced amount of imaging material. The user may also set various conditions pertaining to the imaging material saving mode.

When printing is selected by the application software 12 and a printing command is issued by setting the printing properties, the document data 11 to be printed that is selected by the application software 12 is transferred to the printer driver 13. The printer driver 13 converts the received document data into depiction commands in a format that may be processed by the image processing apparatus 3. It is noted that the printer driver 13 iteratively generates and stores the depiction commands in the disk 14.

When the image processing apparatus 3 receives print commands from the computer 1, the printer driver 13 successively reads the depiction commands stored in the disk 14, and transfers color data included in the depiction commands to the color conversion processing part 31.

The color conversion processing part 31 performs predetermined color conversion processes on the color data in RGB format to obtain corresponding color data in CMYK format compatible with the color imaging apparatus 5, and transfers the CMYK color data to the rendering part 32. The rendering part 32 converts the received color data in command format into corresponding color data in raster format and stores the resulting color data in the band buffer 33. The gray scale processing part 34 performs gray scale processes such as dithering on the image data in raster format that are stored in the band buffer 33 to convert the color data into gray scale data that may be processed by the imaging apparatus 5, and stores the gray scale data in the page buffer 35.

The gray scale data stored in the page buffer 35 of the image processing apparatus 3 may be read by the computer 1 and transmitted to the designated imaging apparatus 5. In turn, the designated imaging apparatus 5 may receive the gray scale data, form a corresponding image, and output the image onto a recording medium.

According to the present embodiment, color conversion processes, rendering processes, and grayscale processes are performed at the image processing apparatus 3 that is separate from the computer 1 and the imaging apparatus 5. However, the processing functions described above may also be implemented at the computer 1 functioning as an information processing apparatus. In this case, the processing functions of the image processing apparatus 3 described above may be embodied by software (programs) or a dedicated processing device such as an ASIC implemented in the computer 1, for example. Alternatively, the functions of the image processing apparatus 3 may be implemented in a control unit of the imaging apparatus 5. Also, the processing functions may be realized by an independent control apparatus such as a dedicated print server that is separate from the imaging apparatus.

In the following, an embodiment is described in which the computer 1 includes a printer driver that is capable of executing one or more of the processing functions of the image processing apparatus 3 described above.

A printer driver according to the present embodiment has functions of a conventional printer driver preset thereto such as a spool for generating print data, a language monitor, a port monitor for monitoring the state of the imaging apparatus, and state display utility for displaying the state of the imaging apparatus, for example. The printer driver also has plural color matching profiles each corresponding to different types of objects (e.g., a character/mark, a line, graphics, an image) included in a document to be printed, the color profiles being used in performing color matching involving absorbing perceptual color differences between devices to realize a perceptual color match.

The printer driver further includes a matching engine for performing a color matching process on an object using a color profile corresponding to the object and object determining means (step) for determining the type of the object, for example.

When the printer driver receives image data of a document to be printed generated at the application software 12, the object determining means (step) determines the type of each object included in the image data, and the matching engine selects a color profile for each object based on the determination results, and performs a color matching process on each object using the selected color profile to generate image data in CMYK format that may be processed by the imaging apparatus 5. The CMYK image data are then transmitted to the imaging apparatus 5.

The above-described processes are performed for each object, and the resulting image data (print data) corresponding to a document to be printed is transmitted to the imaging apparatus 5 and printed on a printing medium (recording medium).

In the print driver according to the present embodiment, a target pertaining to imaging material saving is set for each type of object, and an imaging material saving color profile (referred to as imaging material saving profile hereinafter) in accordance with the set target is generated so that the amount of imaging material used may be reduced based on this imaging material saving profile.

Specifically, according to the present embodiment, in imaging material saving mode, a target pertaining to imaging material saving for each type of object is set based on conditions set by the user, and when the target is set, the matching engine is arranged to convert a color profile selected from the plural color profiles based on a determination result of the object determining means into a corresponding imaging material saving profile, and perform color matching on the relevant object using the converted image material saving profile. In this way, color reproducing conditions may be adjusted according to the target pertaining to imaging material saving set for each type of object in performing color matching.

Thus, in imaging material saving mode according to the present embodiment, a suitable imaging material saving process may be performed for each type of object depending on whether the object corresponds to a character, a mark, a line, graphics, or an image, for example. That is, the concentration of imaging material used is adjusted according to each type of object upon reducing the imaging material concentration of the output image.

It is noted that by generating an imaging material saving profile for each type of object of a document to be imaged, image reproducing conditions may be changed depending on each type of object of a document to be imaged to thereby realize suitable color reproduction according to preferences of the user pertaining to imaging material saving particularly for a document in which a combination of characters, graphics and/or images are included.

Also, according to the present embodiment, in setting a target pertaining to imaging material saving according to the conditions set by the user, by setting a corresponding target for each type of object of a document, color reproduction in accordance with detailed preferences of the user pertaining to imaging material saving may be realized for a document including a combination of characters, graphics, and/or images, for example.

In the following, the color conversion processing part 31 of the image processing apparatus 3 is described with reference to FIG. 3. It is noted that the functions of the color conversion processing part 31 may alternatively be realized the printer driver as is described above. Also, it is noted that in the example described below, it is assumed that recording liquid (ink) is used in the imaging apparatus so that imaging material saving and its corresponding operation mode is referred to as ink saving and ink saving mode, respectively. However, the present invention is not limited to this example, and a developing agent such as toner may also be used according to another example.

Figure 3:
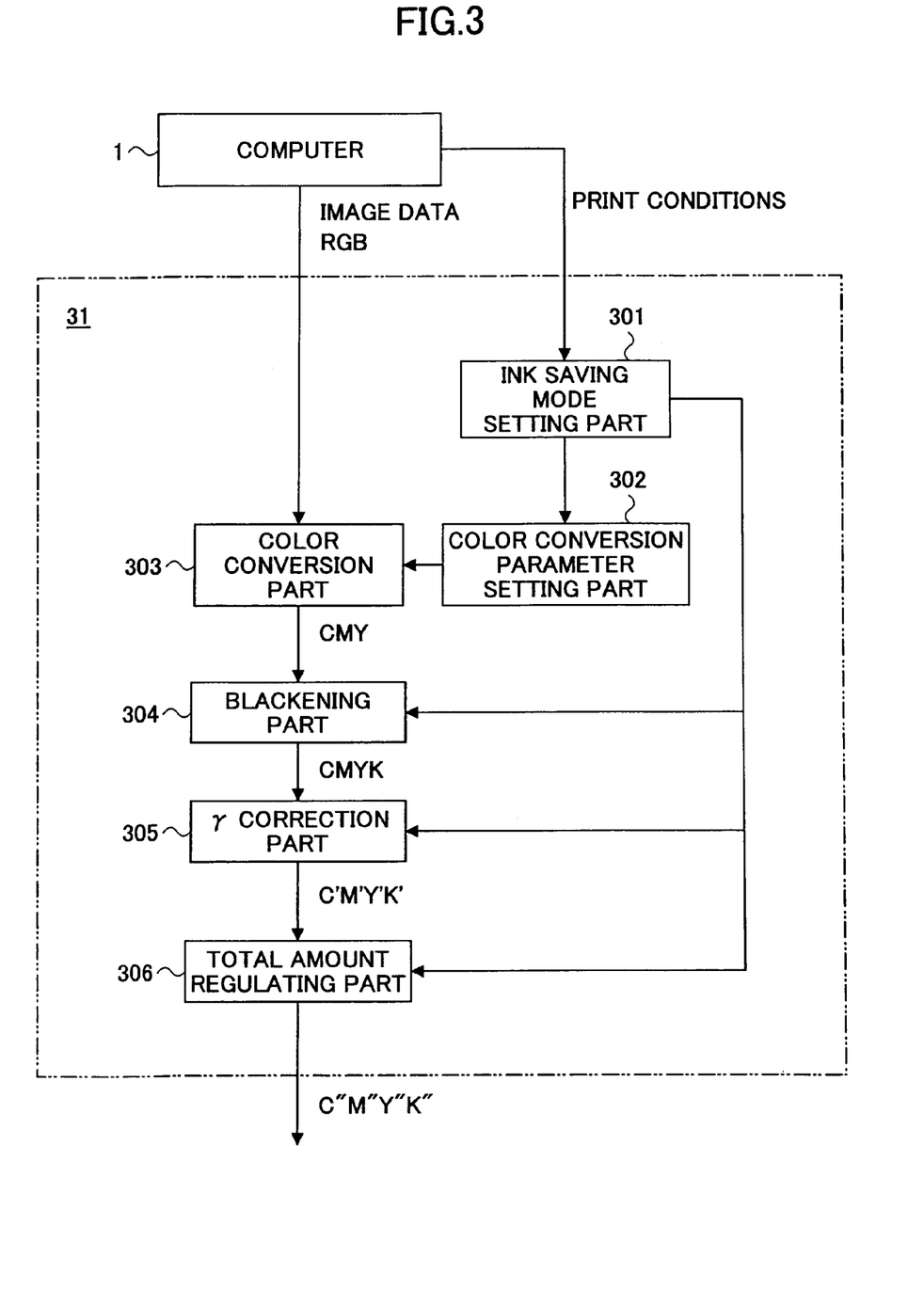
FIG. 3 is a block diagram showing a configuration of a color conversion part of the image processing apparatus according to the present embodiment.

In the illustrated example of FIG. 3, the color conversion processing part 31 includes an ink saving mode setting part 301 corresponding to a target setting part according to an embodiment of the present invention for setting a target pertaining to ink saving based on information pertaining to ink saving conditions (printing conditions) designated by the user via the printer driver 13 of the computer 1, and a color conversion parameter setting part 302 corresponding to a color reproducing condition adjusting part according to an embodiment of the present invention for setting a color conversion parameter based on the target pertaining to ink saving that is set by the ink saving mode setting part 301.

Also, in order to generate and output a CMYK signal from an RGB signal, the color conversion processing part 31 includes a color conversion part 303 that converts an input color signal (signal in RGB format) from the computer 1 into a print color signal (e.g., CMY signal) based on the color conversion parameter set by the color conversion parameter setting part 302, a blackening part 304 that converts the CMY signal into a CMYK signal by adding K (black) components to the CMY signal components according to a UCR (under color removal) or UCA (under color addition) rate, a γ correction part 305 that performs γ correction on the CMYK signal according to imaging engine characteristics to generate/output a C'M'Y'K' signal, and a total amount regulating part 306 that performs a correction process on the γ-corrected C'M'Y'K' signal corresponding to a recording control signal based on a maximum total amount of recording color material that may be used in image formation performed by the imaging apparatus 5 to generate/output a C"M"Y"K" signal.

It is noted that pertinent information of the printing condition information supplied to the ink saving mode setting part 301 from the printer driver 13 is supplied to the blackening part 304, the γ correction part 305, and the total amount regulating part 306.

In the following, color conversion processes performed by the color conversion processing part 31 are described.

Before an RGB input signal corresponding to color data included in a depiction command received from the printer driver 13 is transmitted to the color conversion part 303, conditions pertaining to ink saving that are designated by the user via the printer driver 13 are supplied to the ink saving mode setting part 301. In turn, the ink saving mode setting part 301 sets a target pertaining to ink saving (referred to as ink saving target hereinafter) based on the designated conditions. For example, a percentage (ratio) with respect to the amount of ink used in normal color difference reproduction may be set as the ink saving target (target value).

The color conversion parameter setting part 302 has an output CMY signal value (color conversion parameter) corresponding to a representative RGB value of the RGB space and the amount of ink consumption for the representative RGB (lattice point) signal value stored beforehand. The color conversion parameter setting part 302 compares the ink saving target transmitted from the ink saving mode setting part 305 with an ink consumption amount corresponding to a color conversion parameter, and sets an output CMY signal value (color conversion parameter) that is closest to the target in the color conversion part 303.

In this way, a target pertaining to imaging material saving may be set for reducing the amount of imaging material used based on designated conditions, and a color reproducing condition (color conversion parameter) for input color information used by the color conversion processing part 31 may be changed based on the set target.

The color conversion part 303 uses a three dimensional lookup table made up of the color conversion parameters set by the color conversion parameter setting part 302 to convert an RGB signal into a CMY signal. Specifically, the color conversion part 303 refers to the three dimensional lookup table in which output CMY signal values corresponding to representative RGB values within the RGB space are calculated and stored beforehand, reads plural output values from the three dimensional lookup table, and performs interpolation computation.

Figure 4:
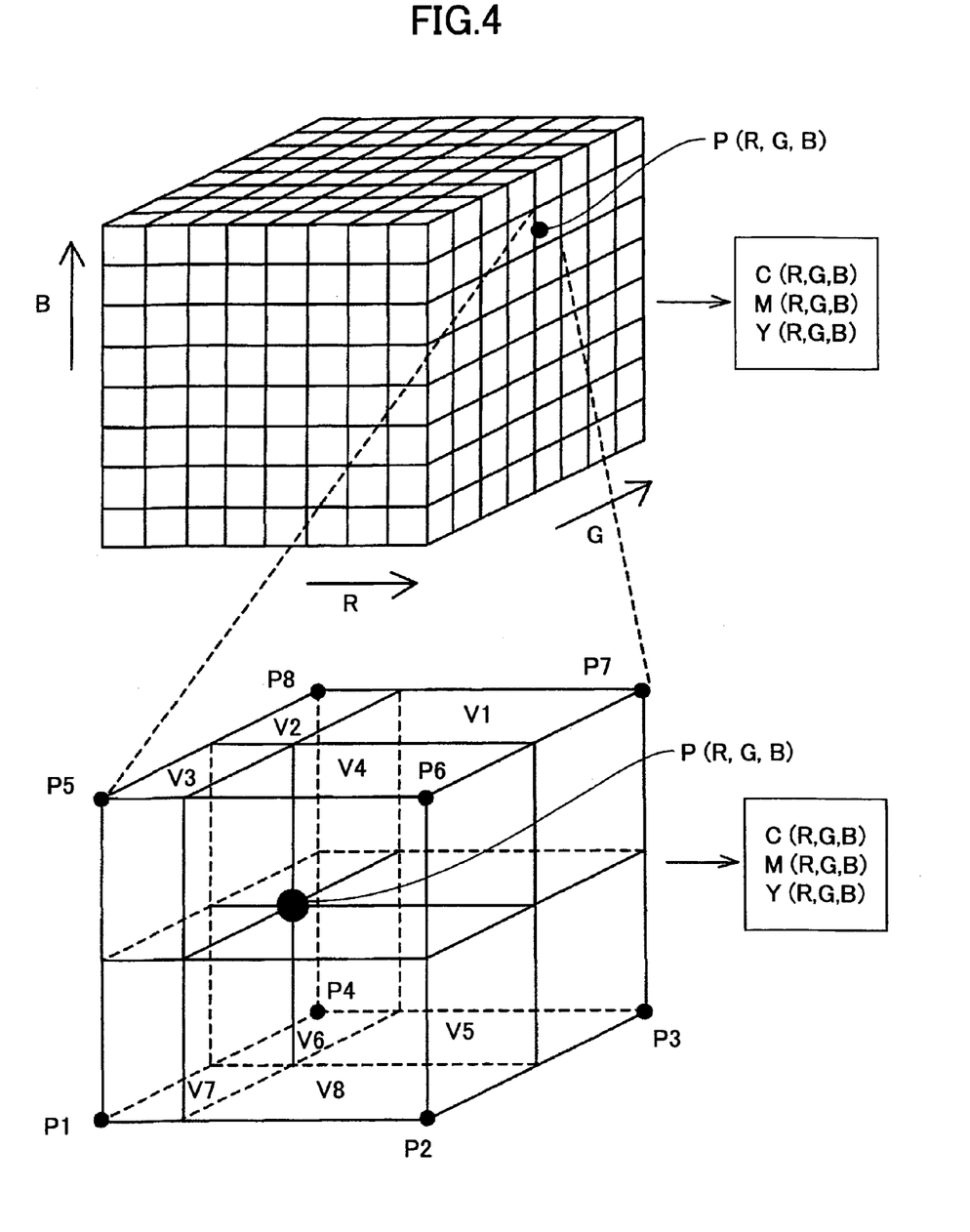
FIG. 4 is a diagram illustrating memory map interpolation that is performed by the color conversion part of the image processing apparatus according to an embodiment of the present invention.

According to the present example, color conversion from gray scale data of the three dimensional color space RGB (red, green, blue) to output color components CMY (cyan, magenta, yellow) data is realized through memory map interpolation.

Referring to FIG. 4, in memory map interpolation, when the RGB space corresponds to the input color space, the RGB space is divided into identical solid figures (e.g., cubes in the illustrated example). In order to obtain an output value P corresponding to input coordinates (R, G, B), the cube including the input coordinates is selected, and linear interpolation is performed based on the output values of eight edge points of the selected cube that are set beforehand and the position of the input coordinates with respect to the selected cube (e.g., its distance from the respective edge points), and using the weighted average of the volumes V1 through V8 of eight cuboids obtained from dividing the selected cube by the point P.

The CMY signal obtained by the color conversion part 303 is supplied to the blackening part 304, and the blackening part 304 performs a process of replacing the common portions of the C, M, and Y components into K (black) components. For example, the process of converting a CMY signal into a CMYK signal may be performed based on the UCR (UCA) rate using the following formulae (1).

$$K'=\alpha \times (\min(C,M,Y)-Th)$$

$$C'=C-\beta \times (\min(C,M,Y)-Th)$$

$$M'=M-\beta \times (\min(C,M,Y)-Th)$$

$$Y'=Y-\beta \times (\min(C,M,Y)-Th) \quad (1)$$

(wherein min (C, M, Y) represents the minimum CMY value, α and β represent constants, and Th represents the blackening start point)

According to formulae (1), when α=β=1 and Th=0, the UCR rate is equal to 100%.

Then, the γ correction part 305 performs γ correction on the CMYK signal according to the imaging engine characteristics to generate a C'M'Y'K' signal. Then, the total amount regulating part 306 performs correction on the C'M'Y'K' signal according to the maximum total amount value of recording color material that may be used in image formation by the imaging apparatus 5 to generate a C"M"Y"K" signal.

According to the present example, by setting a target pertaining to imaging material saving for reducing the amount of imaging material used based on designated conditions and changing color reproducing conditions for input color information based on the set target, color reproduction according to specific preferences of the user pertaining to imaging material saving may be performed by the imaging apparatus.

In the following, processes performed by the color conversion parameter setting part 302 for adjusting the color reproducing conditions according to the ink saving target set by the ink saving mode setting part 301 is described.

First, an example of correcting a γ value of an input color space is described. For example, in a case of performing RGB→Lab (LCH) color space conversion involving converting an RGB signal corresponding to a representative lattice point of RGB input space into Lab color space, provided that the standard RGB signal (sRGB) of eight bits (0 though 255) is subject to conversion, a device-independent color signal represented by luminance (L), chrominance (C), and hue (H) may be obtained by using the following formulae (2) through (5).

$$r=(R/255)\gamma$$

$$g=(G/255)\gamma$$

$$b=(B/255)\gamma \quad (2)$$

(wherein γ=1.0~2.4)

$$X=0.4124 \times r+0.3576 \times g+0.1805 \times b$$

$$Y=0.2126 \times r+0.7152 \times g+0.0722 \times b$$

$$Z=0.0193 \times r+0.1192 \times g+0.9505 \times b \quad (3)$$

$$L^*=116(Y/Y_0)^{1/3}-16$$

$$a^*=500[(X/X_0)^{1/3}-(Y/Y_0)^{1/3}]$$

$$b^*=200[(Y/Y_0)^{1/3}-(Z/Z_0)^{1/3}] \quad (4)$$

(wherein $Y/Y_0>0.008856$, and X0, Y0, and Z0 represent reference reflection plane values)

Luminance: L

Chrominance: $C=(a2+b2)0.5$

Hue: $H=a \times \tan 2(b,a) \times 180/\pi$ (5)

(wherein when a=b=0, H=0; and when H<0, H=360+H)

According to one example, γ values within the range of 1.0~2.4 may be scaled at a pitch of 0.2 to set color conversion parameters, and corresponding ink consumption amounts may be estimated for the respective γ values to be stored in the color conversion parameter setting part 302.

In this case, a color conversion parameter may be selected based on the ink saving target set at the ink saving mode setting part 301 so that the color reproducing conditions may be adjusted according to the ink saving target.

By adjusting the γ value of the input color space upon adjusting the color reproducing conditions based on the ink saving target; namely, by generating plural color conversion parameters of differing γ values beforehand and selecting a γ value therefrom to adjust the γ value, imaging material saving according to preferences of the user may be performed with relatively simple control processes while realizing a suitable color reproduction particularly for natural images.

In the following, an example of changing a compression rate for the color gamut of a perceptual color space is described.

Gamut compression is known as one type of image processing technique for absorbing the differences in the color reproducing range (gamut) between devices, the gamut compression technique involving mapping a color that is not reproducible at an output device to a reproducible color on a three dimensional space defined by luminance, chrominance, and hue as its axes. In the example described below, it is assumed that gamut compression processes are performed on lattice data that are converted into the CIE Lab standard to map the lattice data to a color that is reproducible by the imaging apparatus.

Figure 5:
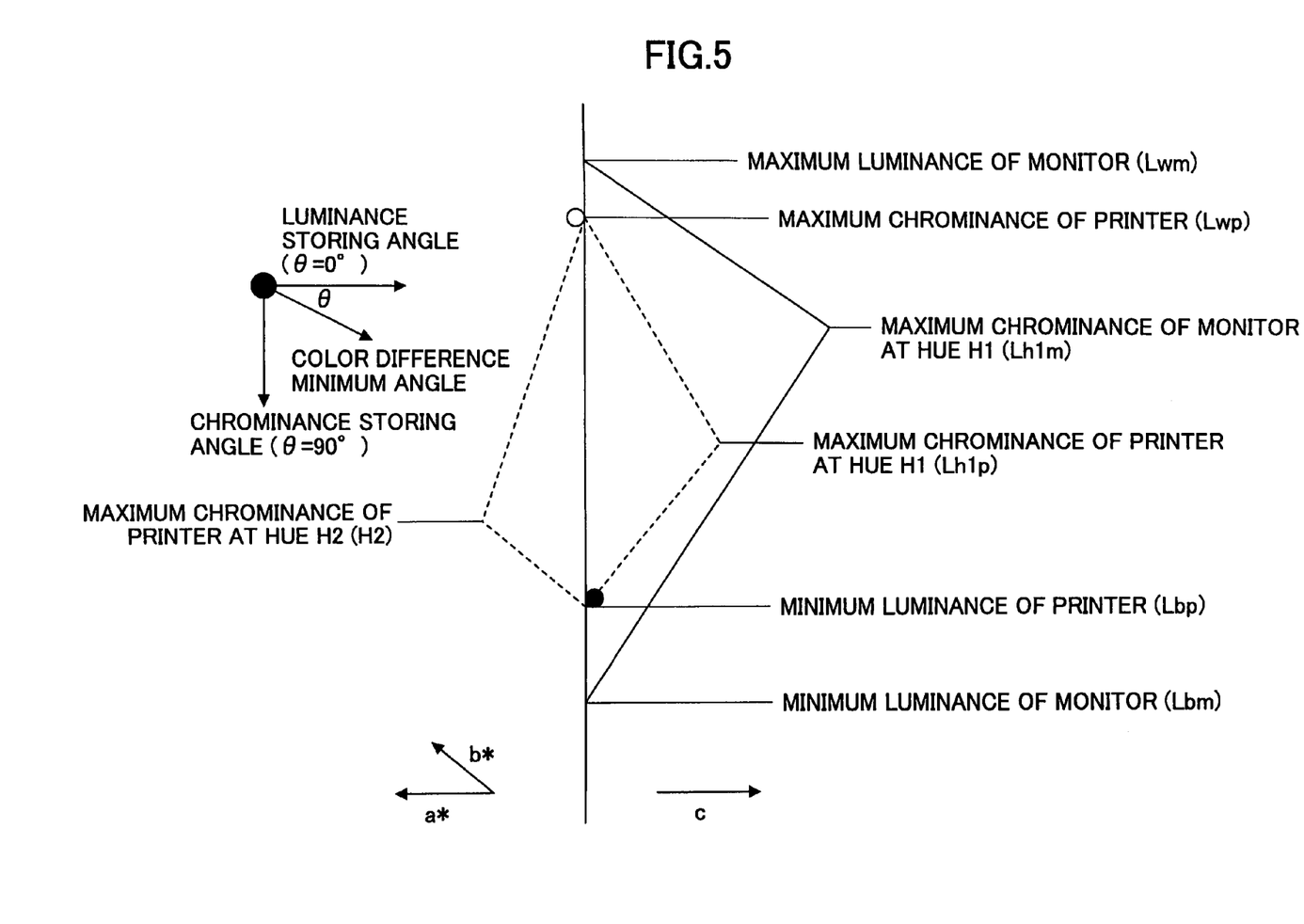
FIG. 5 is a diagram illustrating gamut compression processing that is performed by the color conversion part according to an embodiment of the present invention.

FIG. 5 is a diagram illustrating an exemplary relation between a color gamut of a monitor (display) and a gamut of a printer (imaging apparatus).

In the illustrated example of FIG. 5, the following formulae (6) may be used to perform luminance compression and chrominance compression.

when L≧=Lh1p, $$L'=(Lwp-Lh1p)\times(L-Lh1p)/(Lwm-Lh1p)+LH1p$$

when L<Lh1p, $$L'=(Lh1p-Lbp)\times(L-Lbm)/(Lh1p-Lbm)+Lbp$$

$$C'=C\times\alpha\times(L'/l) \qquad (6)$$

(wherein Lwp represents the maximum luminosity of the imaging apparatus; Lbp, the minimum luminosity of the imaging apparatus; Lwm, the maximum luminosity of the display; Lbm, the minimum luminosity of the display; Lh1p, the luminosity of the maximum chrominance color of the imaging apparatus with a hue of H1; and α, the compression coefficient)

In this case, color conversion parameters that are assigned different compression coefficients α may be generated and corresponding ink consumption amounts may be estimated and stored in the color conversion parameter setting part 302.

Accordingly, a color conversion parameter may be selected from the stored color conversion parameters based on the ink saving target set at the ink saving mode setting part 301 so that the color reproducing conditions may be adjusted according to the ink saving target.

It is noted that color space conversion is performed on the lattice data (L'C'H') obtained by performing the gamut compression process as is described above to convert the data in Lab (LCH) format into a CMYK signal. According to one method of performing the color conversion, the Lab→CMYK input/output relation may be determined beforehand, and C, M, Y, (K) values may be set that correspond to L*, a*, b* values that are calculated based on the determined data using the least square method, for example.

According to the present example for changing the color reproducing conditions based on the ink saving target, color gamut compression conditions for input color information are adjusted. Specifically, color parameters having different compression rates (compression coefficients α) for a gamut of a perceptual color space are generated and stored beforehand, and the gamut compression conditions are adjusted by selecting a color conversion parameter from the stored parameters to thereby realize imaging material saving according to preferences of the user while avoiding outputting color differences that are perceptible to the human eye in color reproduction.

In the following, an example of changing the compression direction angle of a color gamut of a perceptual color space as another example of changing the color gamut compression conditions (color reproducing conditions) for input color information is described.

As is described above, an input color that is compressed according to the dynamic range of the imaging apparatus is compared with color reproduction range (gamut) information of the imaging apparatus, for example. If the input color is within the gamut (i.e., if the input color value is less than the maximum chrominance for its corresponding hue and luminosity), the input color does not have to be compressed. If the input color is outside the gamut (i.e., if the input color value is greater than the maximum chrominance for its corresponding hue and luminosity), the input color may be mapped to gamut outer boundary data in a direction angle θ with respect to a certain hue plane as is shown in FIG. 5, for example.

In the present example, color conversion parameters that are assigned different values of θ ranging from an angle with the minimum color difference to the angle with a fixed luminance (θ=0°) are generated and their corresponding ink consumption amounts are estimated and stored in the color conversion parameter setting part 306.

Accordingly, by selecting a suitable color conversion parameter from the plural color conversion parameters stored in the color conversion parameter setting part 306 according to the ink saving target set by the ink saving mode setting part 301, the color reproducing conditions may be adjusted according to the set ink saving target.

According to the present example of changing the color reproducing conditions according to the ink saving target, gamut compression conditions for input color information are changed; that is, color conversion parameters with different compression direction angles of a gamut of a perceptual color space are generated and stored beforehand and a suitable color conversion parameter is selected therefrom to adjust the gamut compression conditions and realize imaging material saving according to preferences of the user while preventing output of color differences that are perceptible to the human eye particularly in realizing color reproduction of a graphic image.

As is described above, by estimating the amount of imaging material used for realizing at least one color reproducing condition for an input image, comparing the estimated amount with a designated target pertaining to imaging material saving, and setting a color reproducing condition based on the comparison result, color reproduction may be realized by an imaging apparatus according to preferences pertaining to imaging material saving designated by a user and the characteristics of the input image.

Figure 6:
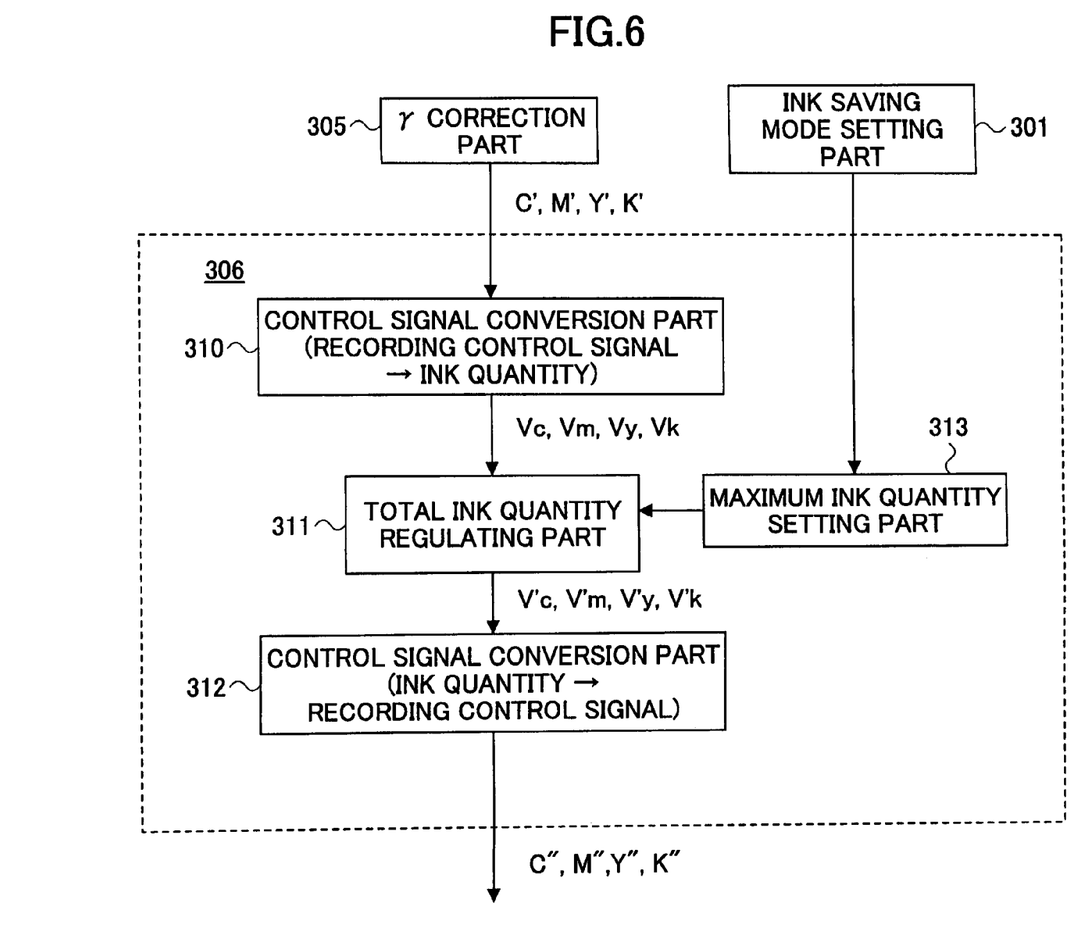
FIG. 6 is a block diagram showing a configuration of a total amount regulating part of the image processing apparatus according to an embodiment of the present invention.

In the following, the total amount regulating part 306 is described in detail with reference to FIG. 6.

The total amount regulating part 306 includes a control signal conversion part 310 that converts the recording control signal (C'M'Y'K' signal) from the γ correction part 305 into ink quantities, a total ink quantity regulating part 311 that regulates the total amount of ink to be used based on the conversion result obtained by the control signal conversion part 310, a control signal conversion part 312 that converts the conversion result obtained by the total ink quantity regulating part 311 into a recording control signal, and a maximum ink quantity setting part 313 for setting a maximum ink quantity limit based on information pertaining to print conditions from the ink saving mode setting part 301.

Figure 7:
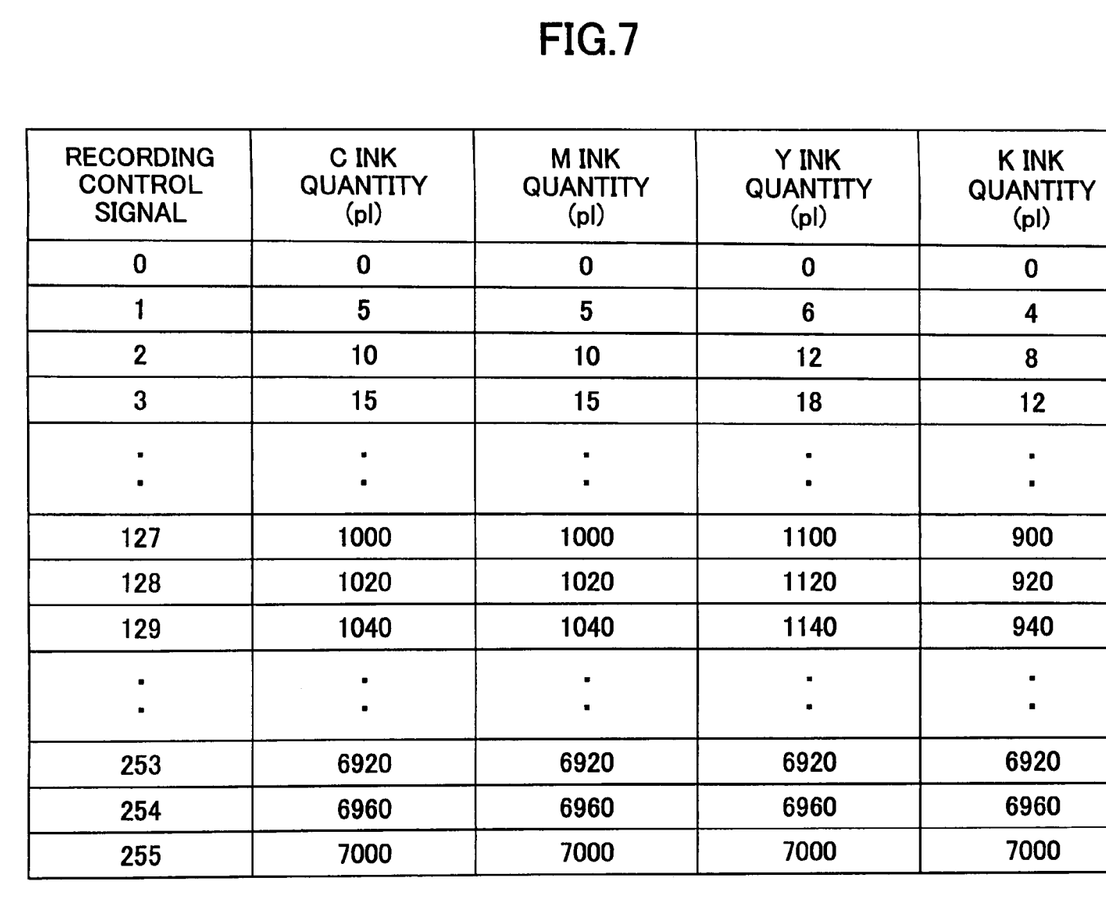
FIG. 7 is a diagram showing an exemplary configuration of a table used in converting a recording control signal into ink quantities at the total amount regulating part according to an embodiment of the present invention.

The control signal conversion part 310 converts the C'M'Y'K' signal corresponding to a recording control signal from the γ correction part 305 into ink quantities Vc, Vm, Vy, and Vk corresponding to amounts of inks of the respective color components actually used. The conversion may be realized using a one dimensional table indicating the corresponding relation between a recording control signal (CMYK) and an ink quantity (V) as is shown in FIG. 7, for example.

The total ink quantity regulating part 311 performs control operations on the data converted into ink quantities Vc, Vm, Vy, and Vk for the respective color components using formulae (7) indicated below, for example, so that the total ink quantity does not exceed the maximum ink quantity limit, and generates/outputs a signal representing ink quantities V'c, V'm, V'y, and V'k. It is noted that in a case where the total ink quantity does not exceed the maximum ink quantity limit, the ink quantities do not have to be regulated, and thereby, the ink quantities Vc, Vm, Vy, Vk, may be equal to the ink quantities V'c, V'm, V'y, and V'k, respectively.

when $(Vc+Vm+Vy+Vk) > Max\_Ink$, $$V'c = t \times Vc$$

$$V'm = t \times Vm$$

$$V'y = t \times Vy$$

$$V'k = Vk$$

$$t = (Max\_Ink - Vk)/(Vc+Vm+Vy) \quad (7)$$

(wherein Max_Ink represents the maximum ink quantity)

According to the present example, the maximum ink quantity setting part 313 is configured to receive print conditions such as the type of recording medium (printing medium), the printing method, the resolution, the gray scale processing method, and the color reproducing method that are set by the user upon directing the execution of a print operation, set the maximum ink quantity based on the received print conditions, and transmit the set maximum ink quantity to the total ink quantity regulating part 311.

In this way, the signal representing the ink quantities V'c, V'm, V'y, and V'k that are output from the total ink quantity regulating part 311 are converted once again into a recording control signal C"M"Y"K". In one example, the conversion may be realized using the one dimensional table shown in FIG. 7 indicating the correspondence between a recording control signal (CMYK) and ink quantities (V) to reconvert the signal representing the ink quantities into a recording control signal (CMYK). However, the present invention is not limited to use of a table and the conversion may also be realized using other means.

It is noted that according to an embodiment, the printer driver includes an allowable color difference setting part for setting the an allowable color difference with respect to predetermined color information designated by a user, and an estimating part for estimating a reproduction color and a color difference for the color information under color reproducing conditions adjusted by the color conversion parameter setting part, for example. Thus, a color conversion parameter in accordance with the allowable color difference may be selected to realize color reproduction by an imaging apparatus according to preferences of the user pertaining to imaging material saving and color reproduction.

In this case, when the corresponding reproduction color and color difference for a given color (color information) under the adjusted color reproducing conditions exceeds the allowable color difference for this color, a message may be displayed at a display to prompt a user to choose whether to perform the imaging operation at the designated imaging material saving mode. In this way, color reproduction by an imaging apparatus according to preferences of the user pertaining to imaging material saving and color reproduction may be realized through relatively simple control operations.

Figure 8:
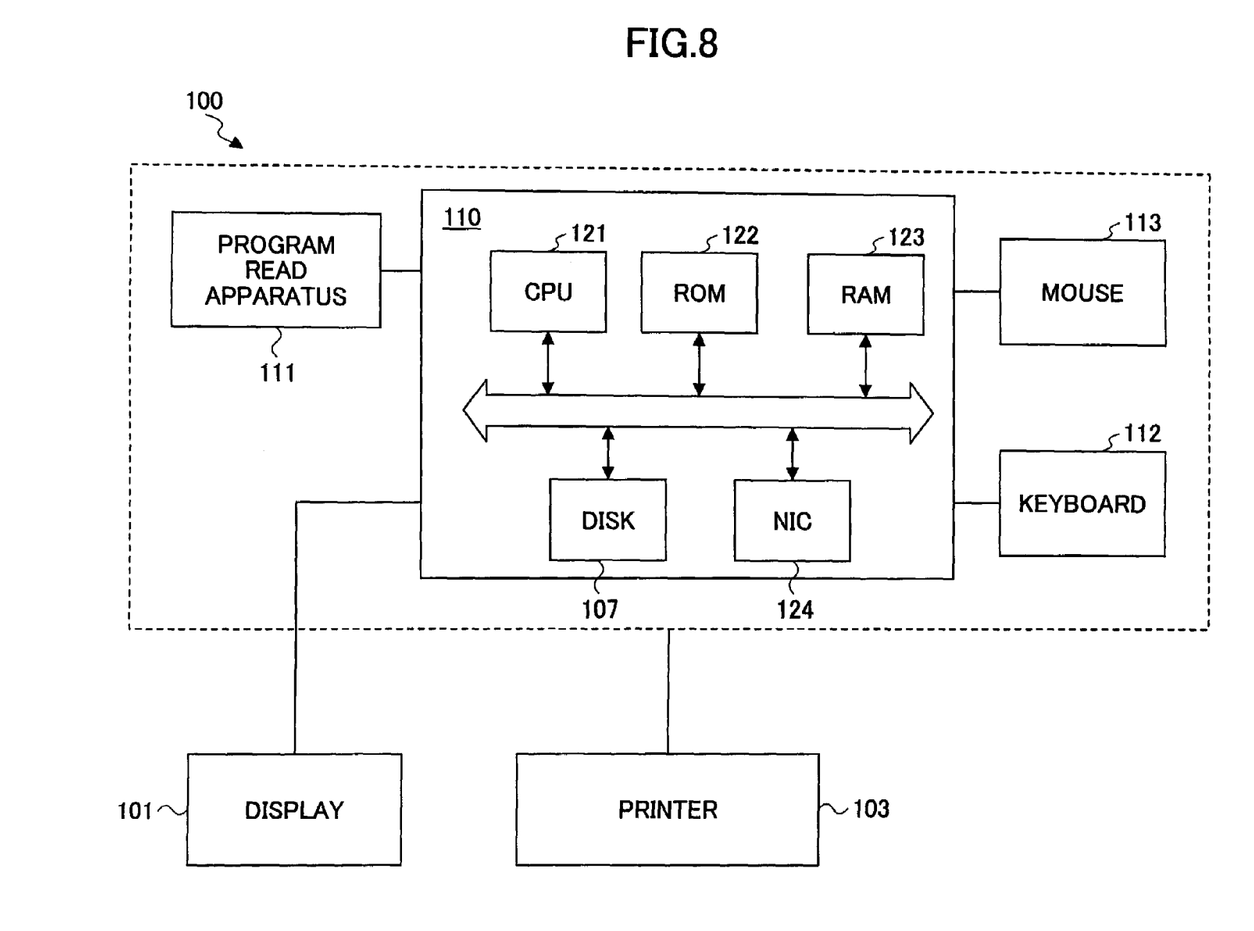
FIG. 8 is a block diagram showing a configuration of an information processing system that uses a computer-readable medium storing one or more programs according to an embodiment of the present invention.

FIG. 8 is a block diagram illustrating a configuration of an information processing system using a computer-readable medium storing one or more program (e.g., printer driver) for executing the image processing operations described above. In the following, such an information processing system according to an embodiment of the present invention is described.

The illustrated information processing system includes a computer 100 such as a workstation, a display 101, and a printer 103 as an imaging apparatus. The computer 100 is configured to realize the color conversion processing functions described above, and includes a computational processing apparatus 110, a program read apparatus, a keyboard 112, and a mouse 113, for example.

The computational processing apparatus 110 includes a CPU 121, programs to be executed by the CPU 121, a ROM 122 for storing other forms of fixed data, a RAM 123 for temporarily storing data such as image data, a DISK 107 such as a hard disk corresponding to a large capacity storage device, a NIC 125 for establishing communication with an apparatus connected via a network, and a bus interconnecting the above elements of the computational processing part 110.

The program read apparatus 111 may correspond to a device such as a flexible disk drive, an optical disk drive, or a magneto-optical disk drive that is adapted to read program codes stored in a storage medium such as a flexible disk, a hard disk, an optical disk (e.g., CD-ROM, CD-R, CD-RW, DVD-ROM, DVD-RAM), a magneto-optical disk, a memory card, for example.

The program codes stored in the storage medium may be read by the program read apparatus to then be stored in the DISK 107. The program codes stored in the DISK 107 may then be executed by the CPU 121 so that the above-described image processing processes may be performed.

It is noted that in executing the program codes read from the storage medium, an OS (operating system) or a device driver operating on the computer 100 may be arranged to execute a part or all of the above-described image processing operations according to instructions included in the program codes.

Also, the program codes read from the storage medium may be written in a memory provided in a functional extension card inserted into the computer 100 or a functional extension unit that is connected to the computer 100 (not shown), for example. In this case, a part or all of the above-described image processing operations may be executed by a CPU provided in the functional extension card or functional extension unit according to instructions included in the program codes.

As can be appreciated from the above descriptions, the present invention may be realized by a printer driver or one or more programs executed by a computer to perform the image processing method according the present invention.

Further, the present invention is not limited to the above-described embodiments, and variations and modifications may be made without departing from the scope of the present invention.

The present application is based on and claims the benefit of the earlier filing date of Japanese Patent Application No. 2004-253819 filed on Sep. 1, 2004, the entire contents of which are hereby incorporated by reference.

What is claimed is:

1. An image processing apparatus comprising:
    a target setting part configured to set a target to reduce an amount of imaging material used, the target being set according to a designated condition;
    a color reproducing condition adjusting part configured to compare an estimated amount of imaging material corresponding to a color reproducing condition with the target, and configured to adjust the color reproducing condition according to the comparison result; and
    an output interface configured to output an image to an imaging apparatus, the image being adjusted according to the color reproducing condition.

2. The image processing apparatus as claimed in claim 1, wherein the color reproducing condition adjusting part is configured to adjust the color reproducing condition with respect to each object included in a document.

3. The image processing apparatus as claimed in claim 2, wherein the target setting part is configured to set the target with respect to each object included in the document.

4. The image processing apparatus as claimed in claim 1, wherein the color reproducing condition adjusting part is configured to adjust a γ value of an input color space.

5. The image processing apparatus as claimed in claim 1, wherein the color reproducing condition adjusting part is configured to adjust a gamut compression condition for input color information.

6. The image processing apparatus as claimed in claim 5, wherein the color reproducing condition adjusting part is configured to adjust a compression direction of a gamut of a perceptual color space.

7. The image processing apparatus as claimed in claim 5, wherein the color reproducing condition adjusting part is configured to adjust a compression rate of a gamut of a perceptual color space.

8. The image processing apparatus as claimed in claim 1, wherein the color reproducing condition adjusting part includes
an allowable color difference setting part configured to set an allowable color difference for predetermined color information,
an estimating part configured to estimate a reproduction color and a color difference corresponding to the color reproducing condition for the color information, and
a color reproducing condition setting part configured to set the color reproducing condition in accordance with the allowable color difference.

9. The image processing apparatus as claimed in claim 1, wherein the color reproducing condition adjusting part includes
an allowable color difference setting part configured to set an allowable color difference for predetermined color information,
an estimating part configured to estimate a reproduction color and a color difference corresponding to the color reproducing condition for the color information, and
a message output part configured to output a message concerning whether to perform imaging material saving which message is output when the estimated color difference for the color reproducing condition exceeds the allowable color difference.

10. A computer-readable medium storing computer-readable instructions thereon, the instructions when executed by a computer cause the computer to perform the steps comprising:
setting a target according to a designated condition, the target being set to reduce an amount of imaging material used;
comparing an estimated amount of imaging material corresponding to a color reproducing condition with the target;
adjusting the color reproducing condition for input color information according to the comparison result; and
outputting an image, processed according to the color reproducing condition, to an imaging apparatus.

11. An image processing method for an image processing apparatus, comprising:
setting, in a target setting part, a target according to a designated condition, the designated target being set to reduce an amount of imaging material used;
comparing, in a color reproducing condition adjusting part, an estimated amount of imaging material corresponding to a color reproducing condition with the target;
adjusting, in the color reproducing condition adjusting part, the color reproducing condition for input color information according to the comparison result; and
outputting an image, processed according to the color reproducing condition, from an output interface to an imaging apparatus.

12. The method according to claim 11, wherein adjusting the color reproducing condition includes adjusting a γ value of an input color space.

13. The method according to claim 11, wherein adjusting the color reproduction condition includes adjusting a gamut compression condition for input color information.

* * * * *